April 30, 1968 W. STERFF 3,381,145

TRANSISTORIZED CONTROL CIRCUIT

Filed Feb. 2, 1966 2 Sheets-Sheet 1

INVENTOR:
Wilhelm Sterff
By Smyth, Roston & Pavitt
Attorneys

INVENTOR:
Wilhelm Sterff
By Smyth, Roston & Pavitt
Attorneys

United States Patent Office 3,381,145
Patented Apr. 30, 1968

3,381,145

TRANSISTORIZED CONTROL CIRCUIT

Wilhelm Sterff, 59 Kreillerstr., 8 Munich, Germany

Filed Feb. 2, 1966, Ser. No. 524,609
Claims priority, application Germany, Feb. 4, 1965, Sch 36,477
8 Claims. (Cl. 307—297)

ABSTRACT OF THE DISCLOSURE

A load, preferably a DC motor, is controlled through a plurality of switching transistors operating in parallel. A pulse controlled driving transistor is connected in parallel to each of the base collector paths and series collector resistors, one for each switching transistor. The pulses may be inserted serially through AC coupling into the emitter-collector path of the driving transistor. Additional base current for the switching transistors can be developed by a feedback loop responding to threshold conditions at the load.

The present invention relates to a transistorized control circuit for DC loads, and herein particularly for loads having rather high power requirements, such as is needed, for example, to start a DC motor.

Control devices of this kind are known in general, and it is also known to perform control operations such as, for example, speed control, by applying discrete voltage pulses to the motor. The pulse control obviates the need for series resistances which usually produce considerable losses. In case of pulse controls it is common to use, for example, electronic switches such as controlled rectifiers, transistors, electron tubes, or the like. These switches turn the load current on and off in response to a sequence of control pulses.

The development of power switching transistors has led to a preference of this type of control elements over others. It is also known to control a rather large current to be applied to a DC load, by connecting several of such transistors in parallel to each other and in series to the load, whereby a driver transistor, or several driver transistors connected in parallel, control the switching transistors in response to a train control signal pulses.

The utilization of such a driver transistor has the disadvantage that in case of rather large power requirements, the total amount of control current necessary to operate all of the several switching transistors produces rather large losses. If one uses a pulse transformer for operating the switching transistors the control becomes more difficult, and the available control range is rather limited. The control range here is the possible variation of the fraction of a given period, during which the load current is turned on. It is by no means possible to use a pulse transformer for covering a range from a continuous "off" state to a continuous "on" state. Additionally, it is very difficult to produce pulses of short duration having steep flanks, by means of pulse transformers. Furthermore, it has to be considered that power transistors, even those of similar type exhibit some tolerances with regard to their electrical characteristics. Thus, it is necessary to use balancing resistances or inductances in the emitter-collector path of the switching transistors, in order to distribute the load current equally over the several switching transistors which are connected in parallel.

It is an object of the present invention to improve circuits of the type described, and particularly to avoid the production of large losses as resulting from the control current necessary to operate the switching transistors. According to one aspect of the present invention in the preferred embodiment thereof it is suggested to connect one or more switching transistors in series with a DC load whereby the switching transistors have their respective emitter-collector paths connected in parallel to each other. The emitter-collector circuit of each of said switching transistors includes a balancing resistor. All of the base electrodes of these various switching transistors are controlled through one or several driver transistors. The emitter-collector path of such a driver transistor is connected in series with all of the base electrodes of the several transistors.

In addition the emitter collector path of such a driver transistor is connected to the same junction to which all of the switching transistors are connected for further connection to the DC load. Thus the driver stage is also connected so that the emitter collector path thereof is in series with the load. This way it is assured that the control current as it flows into the base electrodes of the switching transistors is itself a portion of the load current. In other words the load current which flows into the DC load such as a motor is distributed among the several switching transistors but also to some extent in the driver stage which controls the switching transistors. It is emphasized that the invention operates without additional expenditure of circuit elements but merely by a particular way of providing the circuit connection whereby it is avoided that the control current produces a loss. It is another feature of the present invention to connect the balancing resistors of the several switching transistors in such a manner that for each switching transistor at least a portion of its balancing resistance device appears in parallel circuit configuration across the emitter collector path of a driver stage so that the voltage drop across that portion of the balancing resistance is available for control purposes. According to further features of the present invention means are provided to reduce losses in the switching and control circuits and to permit operation of the switching transistors in the saturation range over a wide range of load currents.

While the specification concludes with claims particularly pointing out and distinctly claiming the subject matter which is regarded as the invention it is believed that the invention the objects and features of the invention and further objects features and advantages thereof will be better understood from the following description taken in connection with the accompanying drawing in which:

Figure 1:
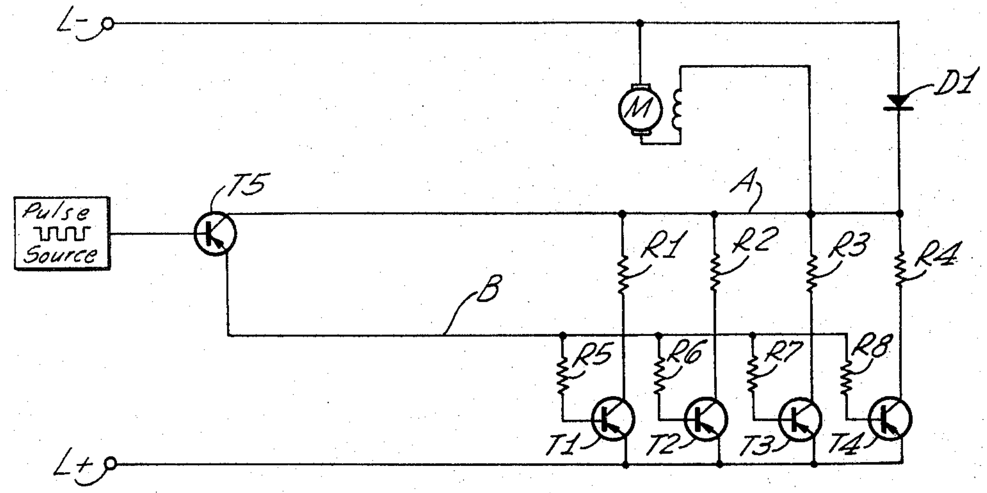
FIGURE 1 illustrates somewhat schematically, a circuit diagram of the first embodiment of the present invention.

Proceeding now to a detailed description of the drawings, in FIGURE 1, thereof, there is shown the first embodiment of the present invention. The figure shows two DC voltage source terminals L+ and L−; a DC motor with series field winding and designated with reference character M, is connected with one side directly to the minus pole of the voltage source, while the other side, particularly the field winding thereof, is connected to a junction A. The junction A receives a controlled voltage and current, the control being produced by a circuit to be described below. A diode D1 is connected across the motor M for filtering and smoothing of the electric current which passes through the motor M. The diode is connected so that the current normally flowing through the motor biases the diode in the reverse.

The current through the motor M is controlled by four switching transistors T1, T2, T3 and T4. The number of transistors is only a representative example and is basically arbitrary as far as the invention is concerned. The number of switching transistors to be employed is determined by the rating of the available type of transistors, and by the load current requirements. The emitter electrodes of these transistors T1 through T4 are interconnected for direct connection to the positive source of potential L+. The collector electrode of each of these transistors is connected to a resistor; they are designated R1, R2, R3 and R4 and connected respectively to the collector electrodes of transistors T1 through T4. The respective other sides of these resistors are interconnected and they connect to terminal or junction A which in turn connects to the field winding of motor M.

The resistors R1 to R4 are balancing resistors and cause equal load currents to be distributed into each of the switching transistors.

The base electrodes of the transistors T1 through T4 are respectively connected individually to resistors R5 through R8, having their respective other sides interconnected to a common terminal, line or junction B. The resistors R5 to R8 distribute a control current flowing in line B into the base electrodes of the switching transistors in order to attain balanced operating conditions for the transistors. A driving transistor T5 is connected across terminals A and B in that the collector electrode of the transistor T5 connects to the common junction A of the resistors R1 through R4, i.e., to the motor circuit, and the emitter of transistor T5 connects to junction B. The base electrode of the transistor T5 is connected to a source of control signals; in particular, these control signals will be voltage blocks or pulses, possibly of controlled duration.

For controlling the motor M the pulse source applies a train or sequence of pulses to the transistor T5. It will be observed, that the collector electrode of transistor T5 is connected to the negative voltage source terminal L— through the motor M. The emitter electrode of transistor T5 is connected through all the emitter base circuits of the control transistors T1 through T4 to the positive voltage source terminal L+. It can thus be seen, that control pulses rendering the base electrode of transistor T5 more negative, cause a voltage drop in line B. The emitter current of transistor T5 is distributed as base current to flow through the base electrodes of all of the switching transistors T1 to T4 rendering same conductive. The collector current of the switching transistors passes as load current through motor M. As the transistor T5 is rendered conductive, its collector current passes also through the motor M as one of the load current components for this motor. It is thus apparent that the control current for the switching transistors constitutes a portion of the load current which flows through motor M.

It is significant that the balancing resistors R1 through R4 are connected in the collector circuits of the control transistors rather than in the emitter circuits thereof. If one would connect the balancing resistors in the emitter circuits of the transistors T1 through T4, it would be possible to omit balancing resistors R5 through R8; however, such a mode of connection would limit the voltage range available for the control of the switching transistors for this reason. The available control voltage for the switching transistors would be merely the voltage drop across the emitter collector path of the switching transistors T1 through T4 themselves. Considering the on-state of the system, a residual voltage would be set up across the emitter collector path of the switching transistors, which residual voltage is so high as the sum of the following voltages: The threshold voltage of the emitter-base path of the switching transistors plus the emitter collector threshold voltage of the driving transistor T5, plus the voltage drop in the resistors R5 through R8 if they are provided. However, if the balancing resistors in the emitter collector paths of the switching transistors are connected as suggested here, i.e., if the load current balancing resistors for the switching transistors are connected in the respective collector circuits thereof, then the following voltage is available for the control of the switching transistors: residual voltage across the emitter collector path of the control transistors T1 through T4, plus the voltage drop across the respective balancing resistors R1 through R4.

Except for rather low load currents, the switching transistors are controlled up to saturation voltage, so that only negligible losses occur anywhere in the circuit. At very small load currents, when the voltage drops across the balancing resistors are negligibly small, a residual voltage will occur across the emitter collector path of the switching transistors which is equal to the emitter base threshold voltage of the switching transistors, plus the emitter collector residual voltage across the driving transistor. The voltage drop across the base resistors R5 through R8 is then negligibly small.

The dimensioning of the components may permit, however, that there are balancing resistances in both the emitter circuits and the collector circuits of the switching transistors. Again, in this case, one can omit the base circuit balancing resistors R5 through R8, but there will be some positive feedback operating additionally for balancing. For control purposes, again, there would be available a somewhat smaller voltage range, which may, however, suffice. In case of small load current, the switching transistors may not reach saturation but the resulting losses are still rather unimportant, and the threshold voltage values are already very small for small currents.

Figure 2:
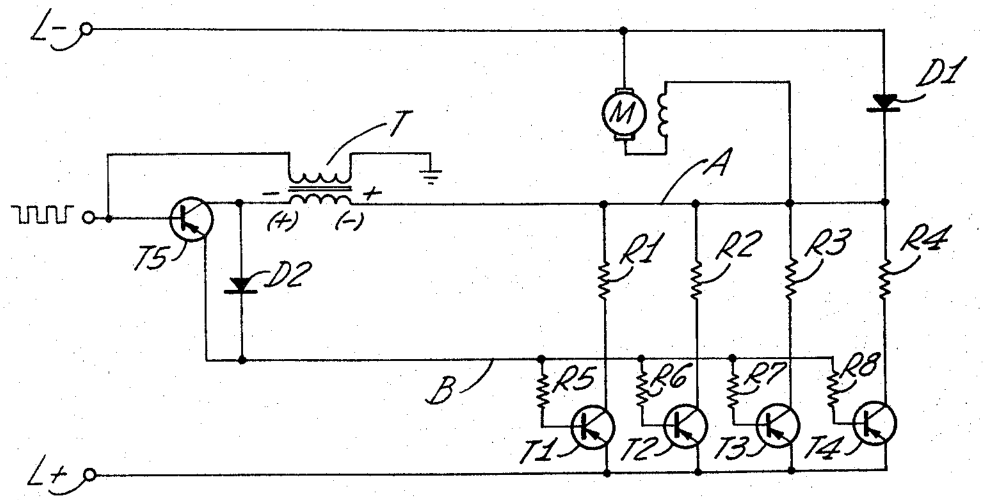
FIGURE 2 illustrates, somewhat schematically, a circuit diagram which is an improvement of the circuit shown in FIGURE 1.

However, for small currents and even in case of small balancing resistors there still are some losses in the control circuit and additional losses in the switching circuit can be avoided. For this purpose it is suggested to additionally connect a supplemental voltage source into the base circuit of the switching transistors. This is illustrated in FIGURE 2. Here it is shown that it is a particular advantage to use as voltage source the voltage developed across the secondary winding of a transformer T. The primary winding of the transformer T receives a voltage which is constituted by the pulsating voltage applied to the base electrode of the transistor T5. The polarity of the connection is selected so that the control effect produced by the transistor T5 with regard to the switching transistors T1 through T4 is re-enforced by the voltage developed across the secondary winding of the transformer T, which is connected in series with the collector emitter path of the transistor T5. The switching transistors are thus driven more readily into saturation for short switching pulse periods.

The emitter collector path of the transistor T5 is shunted by a diode D2 connected thereto in such a manner that its passing direction is opposite to the direction of the emitter collector current of the transistor T5. The transformer T is preferably selceted so that for the duration of a turning-on period of transistor T5, an approximately rectangularly shaped voltage pulse is developed across the transformer secondary winding. In a period of non-conduction of transistor T5, a rather high counter voltage develops across the transformer secondary reinforcing the current cutoff in the switching transistors.

One can see from FIGURE 2 that the polarity of the voltage developed across the secondary of the transformer T is selected so that during a negative pulse period when transistor T5 is rendered conductive the collector thereof is more negative than the potential at line A, which is the common junction of motor and balancing resistors R1 through R5. Thus, the control voltage available at the base electrodes for the switching transistors T1 through T5 is increased (negatively) because the voltage developed across the secondary winding of transformer T is added to the voltage drop developed across the driving transistor T5 itself. At the end of such a negative control pulse T5 is rendered non-conductive, but the voltage developed is reversed, which is shown specifically in FIGURE 2. Upon reversal, the diode D2 is now rendered conductive and applies the potential at the junction, transistor T5; transformer secondary, directly to line B, shunting the transistor T5. Thus the potential now effective in line B is positive in relation to the potential in line A and the control voltage as applied to the base electrodes of switching transistors T1 through T4 causes a rather rapid discontinuance of their emitter collector current, so that the load current as it flows through the switching transistors is interrupted with a rather steep trailing edge.

It is apparent that the interruption of the load current is more rapid the larger the voltage is as developed by the transformer T at reversal of the voltage across the secondary winding. It is apparent, also, that the duration of this counter voltage is immaterial as a brief blocking pulse suffices. It has, however, the additional advantage that one can use transistors with rather low collector blocking voltage. As stated above, due to the voltage reversal of the transformer during the turning off period, the base electrodes of the switching transistors are rendered more positive in relation to the emitter which materially aids in the blocking of current conduction through the switching transistors, regardless of their characteristics. It can be seen, that the circuit illustrated in FIGURE 2 is effective only to the full extent, if the control pulses applied to both, transformer T and driver stage T5 can be regarded as A.C. For switching pulses (negative at the base of T5) of too long a duration, the voltage across the transformer secondary collapses and the circuit will behave as the one shown in FIGURE 1. This is of no disadvantage as saturation of the switching transistors is maintained, and even at the end of a rather long turning-on period, the blocking voltage develops across the transformer secondary.

Turning now to the description of FIGURE 3, there is shown a circuit which includes an automatic control circuit added to the circuit as was described with reference to FIGURE 1. The objective, in particular, of this control circuit is, first, to determine whether or not the voltage in line A exceeds a predetermined threshold value, particularly during conduction of the switching transistors. This control circuit will then be used to increase the base current for the switching transistors. This is of particular advantage in those cases in which the driving transistor T5 is turned on over a rather long period, so that a transformer of the type that was illustrated in FIGURE 2 is rendered ineffective.

Figure 3:
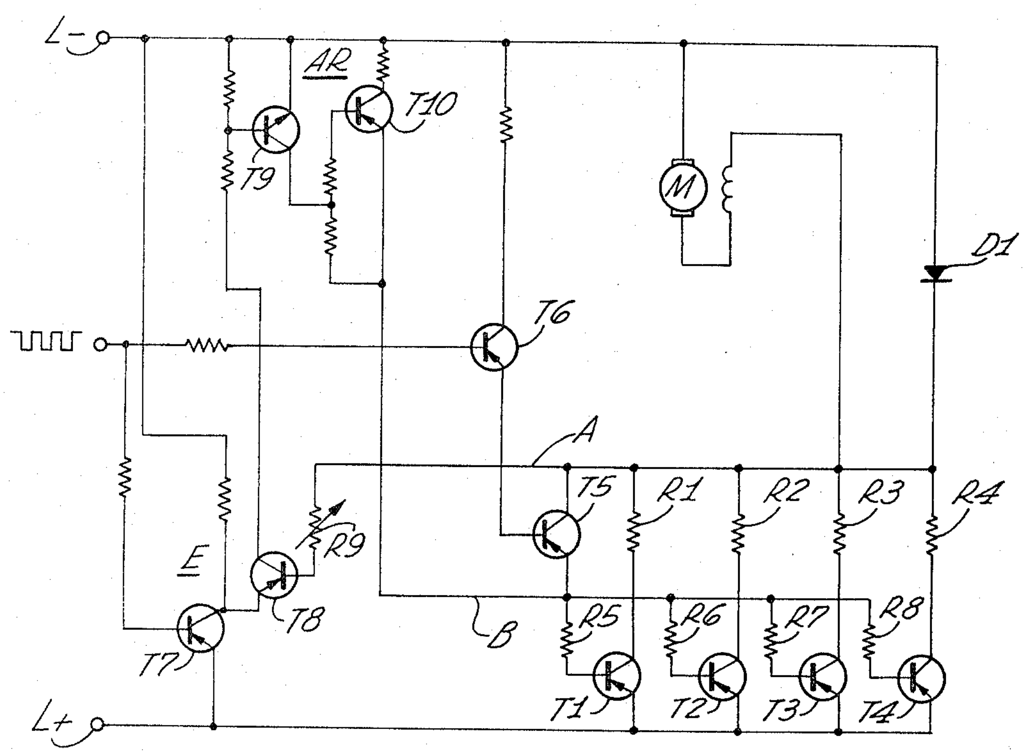
FIGURE 3 illustrates a different improvement of the circuit diagram shown in FIGURE 1.

The circuit illustrated in FIGURE 3 includes all of the circuit elements shown in FIGURE 1 and there is added an automatic feedback control circuit. First of all, it can be seen that the switching pulses are not applied directly to the base electrode of transistor T5, but the base circuit for the transistor T5 is connected in series with the emitter collector path of a control transistor T6, the base of which now receives the train of switching pulses, including pulses of long duration. The junction A is now the point to be monitored as to voltage, particularly in relation to a predetermined threshold value.

There is provided a pulse operated threshold value monitoring circuit E having two transistors T7 and T8. The base electrode of transistor T8 is connected to junction A via an adjustable resistor R9 which thereby provides control for the particular base current for transistor T8 capable of rendering the transistor T8 conductive. The emitter electrode of the transistor T8 is connected to the positive source of voltage potential via the emitter collector path of transistor T7. Transistor T7 has a collector resistor for connecting it to L— independently from the state of conduction of transistor T8. The base electrode of the transistor T7 receives the same switching pulses as they are applied to transistor T6. The voltage at the junction A may exceed a particular value as adjusted by resistor R9, but this can occur only during a turning on period, i.e., when the two transistors T7 and T6 are both rendered conductive. Thus, each switching pulse effectively connects the emitter electrode of transistor T8 to L+, thereby preparing transistor T8 for possible conduction. Transistor T8 will conduct only, if its base current so permits. It can thus be seen that for turning-on periods regardless of duration, transistor T8 can be rendered conductive, if the potential of line A drops below an adjustable value.

The collector electrode of transistor T8 is also connected to the source of negative voltage potential via a voltage divider, the tap of which connects the base electrode of a transistor T8 pertaining to an amplifier AR. Normally, this transistor T9 is not conductive. If, however, the transistor T8 is rendered conductive during a switching pulse period and when an excessive voltage drop prevails at the junction A, then the conduction of transistor T8 causes conduction of transistor T9. The output of transistor T9 controls a transistor T10 having its emitter collector path connected in series to line B. The collector electrode of transistor T10 is connected via a collector resistor to the source of negative potential L—.

As transistor T10 is rendered conductive, it applies this negative potential to the common junction B of the balancing resistors R5 through R8 to thereby increase the base current in the switching transistors T1 through T4 emitter collector path connected in series to line B. The transistors T1 through T4 are rendered more conductive, so that the current flow into the motor M increases. It is deemed apparent that this feedback circuit matches the control of the switching transistors to the load current requirements as presently existing.

It will be appreciated, that some losses occur in the feedback control circuit, though this circuit can be dimensioned to keep these losses rather low; nevertheless, one can see further that the circuit, as shown in FIGURE 3, can be supplemented by a transformer, such as transformer T shown in FIGURE 2. Hence, for a circuit shown in FIGURE 3 one could connect a transformer secondary between line A and the collector of transistor T5. In this case the losses produced in the feedback control circuit will occur only, when the transformer is ineffective, as is the case during long turning-on periods.

As stated above, the transformer is, of course, effective only when the switching pulses occur at a rate high enough to cause the transformer T to operate in ordinary transformer fashion. As long as this is the case, only negligible losses occur in the feedback control circuit, as transistors T8, T9 and T10 remain non-conductive, particularly during turning-on periods when the potential at point A does not drop below the adjusted threshold value. Using a control circuit as shown in FIGURE 3, then losses will occur only for long turning-on periods, and then only for isolated load conditions. Instead of a driving transformer, one could use a DC voltage converter to cover long turning-on periods, but a combination of the circuits as shown in FIGURES 2 and 3 is preferred.

The invention is not limited to the embodiments described above but all changes and modification thereof not constituting departures from the spirit and scope of the invention are intended to be covered by the following claims.

I claim:

1. A transistorized control circuit for connection to a source of DC voltage potential having two terminals of opposite polarity, comprising:

a DC load having two terminals, one terminal thereof for connection to one of the two DC voltage terminals;

at least one switching transistor for connection of one end of its emitter collector path to the other one of said DC voltage source terminals and having the other end of its emitter collector path connected through a balancing resistor to the other one of said load terminals;

a first control circuit including driving transistor having its emitter collector path connected between the base electrode of said switching transistor and said other load terminal, so that the control current fed from the driving transistor to the base electrode of the switching transistor flows substantially also through the load;

a second control circuit connected to be responsive to the potential at said one load terminal and further connected to the base electrode of said switching transistor for applying additional base current thereto; and means for feeding control pulses to the base electrode of said driving transistor and to the second control circuit as enabling signals thereof.

2. A control circuit as set forth in claim 1, said second control circuit having threshold behavior so that the switching transistor is normally under control only of said driving transistors.

3. A transistorized control circuit as set forth in claim 4, said resistors being respectively connected between the collectors of said transistors and said other load terminal.

4. A transistorized control circuit for connection to a source of DC voltage potential having two terminals of opposite polarity, comprising:

a DC load having two terminals, one terminal thereof for connection to one of the two DC voltage source terminals;

a plurality of switching transistors each having an emitter-collector path;

a corresponding plurality of resistors each having respectively first and second ends and being respectively first and second ends and being respectively connected through the first ends in series with the emitter-collector paths of said switching transistors, either of the switching transistor with series resistor defining a series circuit, each series circuit being connected with the second ends of the respective resistor to the other one of said load terminals while the respective other ends of the series circuits are interconnected and connected to the other one of the two voltage source terminals so that said series circuits together from a parallel circuit configuration; at least one driving transistor having its emitter-collector path connected to all the second ends of the resistors at said other load terminal and to each of said base electrodes of said switching transistors, so that the control current for the switching transistors flow substantially also through said load; and means for connecting the base electrode of said driving transistor to a source of control pulses.

5. A transistorized control circuit for connection to a source of DC voltage potential having two terminals of opposite polarity, comprising:

a DC load having two terminals, one terminal thereof for connection to one of the two DC voltage terminals;

at least one switching transistor for connection of one end of its emitter collector path to the other one of said DC voltage source terminals and having the other end of its emitter collector path connected to the other one of said load terminals;

a driving transistor having its emitter collector path connected between the base electrode of said switching transistor and the junction of the emitter collector path of said switching transistor and of said one load terminal;

means for applying control pulses to the base electrode of said driving transistor; and a feedback control circuit connected to said other load terminal for being responsive to the voltage developed at said other load terminals, and being further connected to receive said control pulses to apply an auxiliary control voltage to the base electrode of said switching transistor, the feedback control circuit having threshold behavior for restriction of its operation to a particular range of voltages developed at said switching transistor.

6. A transistorized control circuit for connection to a source of DC voltage potential having two terminals of opposite polarity, comprising:

a DC load having two terminals, one terminal thereof for connection to one of the two DC voltage terminals;

at least one switching transistor for connection of one end of its emitter collector path to the other one of said DC voltage source terminals having the other end of its emitter collector path connected to the other one of said load terminals;

a control circuit including a driving transistor having its emitter collector path connected to the base electrode of said switching transistor;

means for feeding control pulses to the base electrode of said driving transistor; and circuit means for developing a voltage and being connected in series with the emitter-collector path of the driving transistor so that the voltage developed by the circuit means is serially effective with the voltage across the emitter-collector path of the driving transistor, between said one load terminal and the base electrode of said switching transistors, the circuit means being further connected to be responsive to said pulses independently from the driving transistor to develop the voltage for additionally controlling the current flow into said base electrode of said switching transistors, the control current fed from the driving transistor and the circuit means to the base electrode of the switching transistor flows substantially also through the load.

7. A circuit, as set forth in claim 6, said last means including, a transformer having primary and secondary windings the primary winding beam connected to said means for feeding control pulses, for receiving said control pulses, said secondary winding being connected in series with the emitter-collector of the driving transistor so that any voltage developed across said secondary winding is effective at said base electrode of said switching transistor, said primary winding for connection to the source of control pulses in such a manner that the control exerted by said driving transistor is re-enforced.

8. A circuit as set forth in claim 7 comprising, in addition, a unidirectional conductive means connected across the driving transistor for conduction opposite to the driving transistor and being connected in series with the secondary winding, the transformer, in response to a trailing edge of a control pulse, producing a voltage pulse in said secondary having a polarity for rapidly turning off the switching transistor, the latter voltage pulse being applied through the unidirectionally conductive means to the base of the switching transistor.

References Cited

UNITED STATES PATENTS 3,061,741 10/1962 Eckermann et al. ---- 307—88.5
3,092,766 6/1963 Hansen ---------- 307—88.5 X JOHN S. HEYMAN, *Primary Examiner*.